tion obtained might be destroyed by diffusion. The zones will, however, migrate from the column as in ordinary electrophoresis but the column has to be emptied with respect to pH-gradient and zones. If the pH value of the respective zone is to be determined it is not possible to elute the column without removing the tension.

United States Patent Office 3,692,654
Patented Sept. 19, 1972

3,692,654
ELECTROPHORETIC PROCESS
Per Just Svendsen, Glostrup, Denmark, assignor to LKB-Produkter AB, Bromma, Sweden
No Drawing. Filed Apr. 7, 1971, Ser. No. 132,204
Claims priority, application Sweden, Apr. 8, 1970, 4,779/70
Int. Cl. B01k 5/00
U.S. Cl. 204—180 R    6 Claims

ABSTRACT OF THE DISCLOSURE

An electrophoretic process for separating electrically charged components in a solution includes the steps of adding a mixture of ampholytes with different mobility and different isoelectric points to the components to be separated, and applying an electric field to the mixture of ampholytes and components to be separated to form a migrating pH-gradient and a migrating mobility gradient so that the desired components will be separated by the different ampholytes.

---

The present invention refers to a new electrophoretic process for the separation of electrically charged components, preferably amphoteric compounds such as proteins and amino acids. The separation takes place in a migrating pH- and mobility gradient of carrier ampholytes. This pH- and mobility gradient migrates according to the isotachophoretic principle to be described below. As the procedure makes it possible to obtain a separation which depends on the mobility as well as upon the pH, very good results are achieved.

Various electrophoretic separation methods are known per se. In ordinary electrophoresis the components to be separated migrate in an electric field and a separation is obtained due to the fact that the components migrate with different speeds in the field. The degree of separation obtained will then be dependent upon the length of the separation path. A long separation path will, however, require a very high voltage in order to obtain a sufficient electric field strength. If the separation takes place in a column the various substances will further leave the column at different speeds at the elution which is not desirable. Furthermore the various compounds will not be concentrated during the separation but a component that has been introduced into the field within a certain range will after the separation occupy a still wider range because of diffusion effects. The degree of separation will thus be unsatisfactory.

In isoelectric focusing the electrophoresis is performed in a stable pH-gradient generally obtained by a mixture of ampholytes. The pH-gradient is self-stabilizing in the electric field and no migration will take place by the components in the ampholyte mixture at stationary condition. The components, preferably proteins, to be separated migrate in the field and in the pH-gradient at a speed determined by the mobility of the respective components. The mobility is dependent upon the pH value of the surrounding solution and a protein will consequently migrate at a high velocity when it is located in a pH range far away from the range corresponding to the isoelectric point of the protein. The migration speed of the protein will be zero when the pH of the surrounding solution corresponds to the isoelectric point of the protein. By using isoelectric focusing a very high degree of separation can be achieved and the zones obtained will be focused in the electric field. The amount of specimen used can, however, not be allowed to be too high as in this case a precipitation of the separated components might occur if the limit of solubility of the component in the respective zone is exceeded. Furthermore several problems are involved when eluting the column. The elution should preferably be performed without removing the electric voltage as otherwise the separation obtained might be destroyed by diffusion. The zones will, however, migrate from the column as in ordinary electrophoresis but the column has to be emptied with respect to pH-gradient and zones. If the pH value of the respective zone is to be determined it is not possible to elute the column without removing the tension.

In a third electrophoretic process, isotachophoresis, some of the above mentioned drawbacks are avoided. Isotachophoresis or displacement electrophoresis (Martin & Everaerts, Analytica Chimica Acta, 38 (1967), pp. 233–7), is performed by applying an electric field across an electrolyte system comprising the components to be separated as well as a leading and a terminating electrolyte. The leading electrolyte is a component having the same charge as the components to be separated but a higher net mobility. The charge of terminating electrolyte should have the same sign as the one of the leading electrolyte but a lower net mobility than any of the components to be separated. When an equilibrium has been achieved in the system all components having the same charge migrate at a velocity equal to the velocity of the component which has the highest net mobility, i.e., all components migrate with the same velocity as the leading electrolyte and the components form consecutive zones arranged according to the respective net mobility of the components. Furthermore, components having the opposite charge, so called counter ions migrate in an opposite direction. The separation obtained is thus completely depending on the differences in mobility of the components but if components having mobility values close to another are to be separated it is required that a further component is introduced in the system, this further component having a mobility value intermediate of mobility values of the components to be separated. Furthermore, this component has to have such properties that it can be detected separated. In isoelectric focusing the various components are focused within different pH-ranges and the specimen will be spread out along the whole pH-gradient, ampholytes separating the various specimen zones.

In the new process according to the invention all the above discussed drawbacks are eliminated. The characteristics of the invention will appear from the claims of the specification.

In the new procedure the advantages of isoelectric focusing are achieved in an isotachophoretic method. If the components to be separated are amphoteric they will not reach their isoelectric points as the counter ions used according to the invention should have a buffering effect and for instance consist of a weak acid or a weak base. The separation obtained will depend on the mobility of the components as well as on the isoelectric points if the components are proteins or other amphoteric compounds. When using the method according to the invention a protein will be charged during the separation which means that the solubility increases. The method can thus be used on a preparative basis and the amount of specimen applied is not critical. A concentrating effect is obtained. As in ordinary isotachophoresis it is also possible to increase the degree of separation by using a counterflow and thus increase the separation path which has to be covered by the components. In this case the electrophoretic solution must be stabilized by some suitable medium, generally a powder. Such a stabilization can also be used when no counterflow is present but then the stabilization medium is generally a gel for instance agaros gel or polyacrylamide gel.

If the number of components in the ampholyte mixture ie sufficient the components to be separated will always be separated by ampholytes which increases the degree of separation. The properties of the system could be changed by changing counter ion, leading ion or terminating ion. The suitable pH-value of the terminating zone is determined by the net mobilities and concentration of counter ions, leading ions and terminating ions. The ampholyte mixture is ionized by the counter ions so that either an acid or a base mixture is obtained, which means that a migrating pH-gradient is obtained. By suitable change of leading ion and counter ions the pH-gradient of the certain ampholyte mixture might be changed from for instance pH 5–7 to pH 6–8 which of course changes the degree of separation of the system. The pH-gradient can also be changed by using an ampholyte mixture having a different composition.

The ampholyte mixture might consist of a mixture according to the Swedish Pat. 314,227, the mixture comprising aminocarboxylic acids to which different protolytic groups as nitrogen groups and carboxylic groups are connected. It is also possible to use other at present not commercially available mixtures. For those skilled in the art it is also possible to synthetize either a mixture comprising a great number of components each having a differential degree of substitution or to mix components known per se. If an even pH- and mobility gradient should be obtained it is necessary that the number of components is big that is the pH- and the mobility gradient difference between the components is small. It is, however, not possible to determine the number of components which are required as this depends on the interval to be covered by the gradient.

If proteins are to be separated according to the process of the invention it is furthermore desirable that the ampholyte mixture is not ultraviolet absorbing within the absorption range of the proteins. Alternatively it might of course be suitable to have a UV absorbing solution when components which do not absorb UV are separated.

The process according to the invention will now be described in detail by means of a number of examples.

The solutions mentioned in the examples have the following composition.

Gelbuffer, pH=6.1:
    5.2 g. trisbase
    39 ml. 1 M $H_3PO_4$
    0.5 ml. tetramethylethylendiamine (Temed)
    Dist. water to make 100 ml.
Gelbuffer, pH=4.0:
    0.9 g. trisbase
    3.0 ml. glacial acetic acid
    0.3 ml. Temed
    Dist. water to make 100 ml.
Gelbuffer, pH=6.6:
    6.0 g. trisbase
    39 ml. M $H_3PO_4$
    0.9 ml. Temed
    Dist. water to make 100 ml.
Gelbuffer, pH=4.5:
    2.0 g. trisbase
    3.0 ml. glacial acetic acid
    0.3 ml. Temed
    Dist. water to make 100 ml.
Gel solution, 30 percent (weight/volume):
    2.9 g. acrylamide
    1 g. bisacrylamide
    Dist. water to make 100 ml.
Catalyst solution:
    4 mg. riboflavine
    Dist. water to make 100 ml.
Saccharose solution, 25 percent (weight/volume):
    25 g. saccharose
    Dist. water to make 100 ml.
Electrode buffer:
    30 g. glycine
    6 g. trisbase
    Dist. water to make 2000 ml.

EXAMPLE 1

A mixture consisting of 3 ml. gelbuffer pH=6.1, 3 ml. 30-percent gel solution, 3 ml. 25-percent saccharose solution, 12 ml. distilled water and 3 ml. catalyst solution was introduced in a vertical electrophoresis column. Before the solution was introduced one end of the column was sealed by a filter paper which was saturated by the supplied mixture. The filter paper was sealed with a plastic film. The gel mixture was polymerized by UV radiation during 45 minutes and a solid gel was obtained. At the top of this gel a new solution consisting of 2 ml. gelbuffer pH=6.1, 2 ml. 30-percent gel solution, 2 ml. 25-percent saccharose solution, 7 ml. distilled water, 2 ml. catalyst solution and 1 ml. Ampholine® pH=4–8, was introduced. The latter component is a commercially available ampholyte mixture, comprising amino carbon acid, marketed by LKB-Produkter AB, Stockholm. This latter mixture was also polymerized by UV-radiation. Finally a third mixture was introduced in the column, this third mixture consisting of a trisglycine buffer, i.e. the same mixture that was used in the electrode chamber.

The protein specimen of 7 ml. which was to be separated was mixed with 1.25 ml. gelbuffer, pH=6.1 and 1.25 ml. saccharose solution and was diluted with distilled water to make 10 ml. The components of the specimens were thus ionized and the specimen was added to the electrophoresis column. The specimen was preferably introduced above the upper gel.

The tension was applied and the electrophoresis was carried out at a constant current of 10 ma. The phosphate ions which were the ions having the highest mobility worked as leading electrolyte whereas the glycinate ions formed the terminating electrolyte. The tris-ions acted as counter ions. When stationary conditions were achieved all ions in the systems migrated at the same velocity as the phosphate ions and the components of the specimen were separated in the migrating pH-gradient. When the column was eluted the contents was fractionated and a conventional immunochemical analyze of fractions was carried out. According to this analysis the fractions containing orosomucoid and prealbumine were pooled and the mixture was ultrafiltrated and dialyzed against distilled water to a volume of 10 ml.

EXAMPLE 2

This experiment was started in the same way as the previous one, that is the column was filled with a mixture consisting of 3 ml. gelbuffer, pH=4.0, 3 ml. 30-percent gel solution, 3 ml. 25-percent saccharose solution, 12 ml. distilled water and 3 ml. catalyst solution. The mixture was polymerized by UV radiation and a second mixture of 1 ml. Ampholine ® pH=3–7, 1.5 ml. 25-percent saccharose solution and 100 ml. trisbase as well as 10 ml. specimen solution from the above described experiment was added. Furthermore, tris glycine buffer was added and the electrophoresis started. The current during this experiment was 7 ma. The following analyze gave at hand that the components of the specimen had become completely separated and that the orosomucoid but not the prealbumine had become immunochemically pure. Like in the previous experiment the fractions from the prealbumine were mixed and the mixture thus obtained was ultrafiltrated and dialyzed.

EXAMPLE 3

Two different mixtures were introduced in the column as in the first experiment and the thus introduced mixtures were polymerized. Instead of the gelbuffer pH=6.1 previously used, a buffer having a pH value=6.6 was used. 1 ml. Ampholine ® pH=5–7 was used. The specimen was formed by 9 ml. of the mixture obtained from the dialyze of the second experiment and this specimen was diluted with 1.5 ml. gelbuffer pH=6.6 and 1.5 ml. 25-percent saccharose solution. After this separation chemically pure prealbumine as well as prealbumine containing some albumine was obtained.

EXAMPLE 4

This experiment was carried out in order to control the pH-gradient and thus no specimen was added. The experimental conditions were the same as in the second experiment discussed above except that a gelbuffer having a pH-value of 4.5 and Ampholine ® pH=3-8 were used. The experiment was stopped before the leading electrolyte consisting of acetate ions had migrated out from the gel. The gel was eluted from the column and divided into 10 sections, each of which were treated with distilled water. The pH-value of the respective zones were then determined and it was found that the pH-value varied almost linearly from 4.5 to 8.5 along the gel. The length of the gel was about 8 centimeters.

We claim:

1. A method for isotachophoretic separation of electrically charged components in a solution, where the components having the same charge and sign migrate in an electric field at a velocity equal to the velocity of the component having the highest net mobility, the components forming consecutive zones the order of which is determined by the net mobility of the components, and where components having opposite charge, so called counter ions migrate in an opposite direction, characterized in, that a mixture of ampholytes is added to the components to be separated in order to form a migrating mobility- and pH-gradient in the electric field, each ampholyte of the mixture having different mobility and isoelectric points, the mobility difference of consecutive ampholytes being small and each ampholyte in the mixture having a definite pH-value corresponding to the isoelectric point of the respective ampholyte, said pH-value being determined by the counter ions used, said counter ions being buffering and the mobility range of the ampholyte mixture being chosen in such a way that it covers the mobility range of the components to be separated.

2. Method according to claim 1, characterized in that the counter ions are chosen in such a way that a pH-gradient suitable for the desired separation is obtained.

3. Method according to claim 1, characterized in, that the electrically charged components to be separated are formed by amphoteric compounds, such as proteins or aminoacids.

4. Method according to claim 1, characterized in, that the ampholyte mixture is formed by at least three polyprotic groups, at least one of which is a carboxylic group and one is a basic nitrogen atom.

5. Method according to one of claim 1, characterized in, that the separation solution is stabilized at least to a certain extent by a gel.

6. Method according to one of claim 1, characterized in, that the separation solution is stabilized by a power medium and that the components to be separated migrate electrophoretically against a liquid counterflow.

References Cited

Martin & Everaerts: Analytica Chimica Acta (1967), pp. 233-7.

Proteids of the Biological Fluids, vol. 15, pp. 515-522, Amsterdam, 1968.

Nuclear Instruments and Methods, vol. 56, pp. 151-153, 1967.

HOWARD S. WILLIAMS, Primary Examiner

A. C. PRESCOTT, Assistant Examiner

U.S. Cl. X.R.

204—180 G